(12) United States Patent  
Yogodzinski

(10) Patent No.: US 8,668,415 B2  
(45) Date of Patent: Mar. 11, 2014

(54) SHIPPING SUPPORTS FOR TAPERED ELONGATED STRUCTURES

(75) Inventor: Brian Yogodzinski, Oviedo, FL (US)

(73) Assignee: Siemens Aktiengesellschaft, München (DE)

(\*) Notice: Subject to any disclaimer, the term of this patent is extended or adjusted under 35 U.S.C. 154(b) by 0 days.

(21) Appl. No.: 13/309,636

(22) Filed: Dec. 2, 2011

(65) Prior Publication Data

US 2013/0142585 A1   Jun. 6, 2013

(51) Int. Cl.
 *B60P 7/12*   (2006.01)

(52) U.S. Cl.
 USPC ............................................. 410/44

(58) Field of Classification Search
 USPC ..................... 410/44, 45, 47, 49, 53
 See application file for complete search history.

(56) References Cited

U.S. PATENT DOCUMENTS

| | | | | |
|---|---|---|---|---|
| 3,071,269 | A * | 1/1963 | Moulds, Jr. | 414/608 |
| 5,579,698 | A * | 12/1996 | Lis et al. | 105/364 |
| 7,591,621 | B1 * | 9/2009 | Landrum et al. | 410/45 |
| 8,142,120 | B2 * | 3/2012 | Landrum et al. | 410/44 |
| 2007/0177954 | A1 * | 8/2007 | Kootstra et al. | 410/44 |
| 2007/0189895 | A1 * | 8/2007 | Kootstra et al. | 416/9 |
| 2008/0213059 | A1 * | 9/2008 | Wright et al. | 410/49 |
| 2008/0272075 | A1 * | 11/2008 | DeMent | 211/85.5 |
| 2009/0169323 | A1 * | 7/2009 | Livingston | 410/120 |
| 2011/0097171 | A1 | 4/2011 | Landrum | |

\* cited by examiner

*Primary Examiner* — H Gutman

(57) ABSTRACT

A support saddle (20, 24) for supporting a load (14) having a taper profile along an axial length of the load (14). The support saddle (20, 24) comprises a lower surface (20A, 24A) for resting on a surface (10A) of a transportation vehicle load bed (10) and an upper surface (20B, 24B) defining a taper to substantially match the taper profile of the load (10) in a region of the load contacting the upper surface (20B, 24B), the upper surface (20B, 24B) for receiving the load (10). In other embodiments the support saddles (20, 24) are used with inserts (64, 65) and/or cushions (45). One or more of the support saddles (20, 24), the inserts (64, 65) and the cushions (45) may comprise a tapered upper surface to match the taper profile of the load (14).

19 Claims, 4 Drawing Sheets

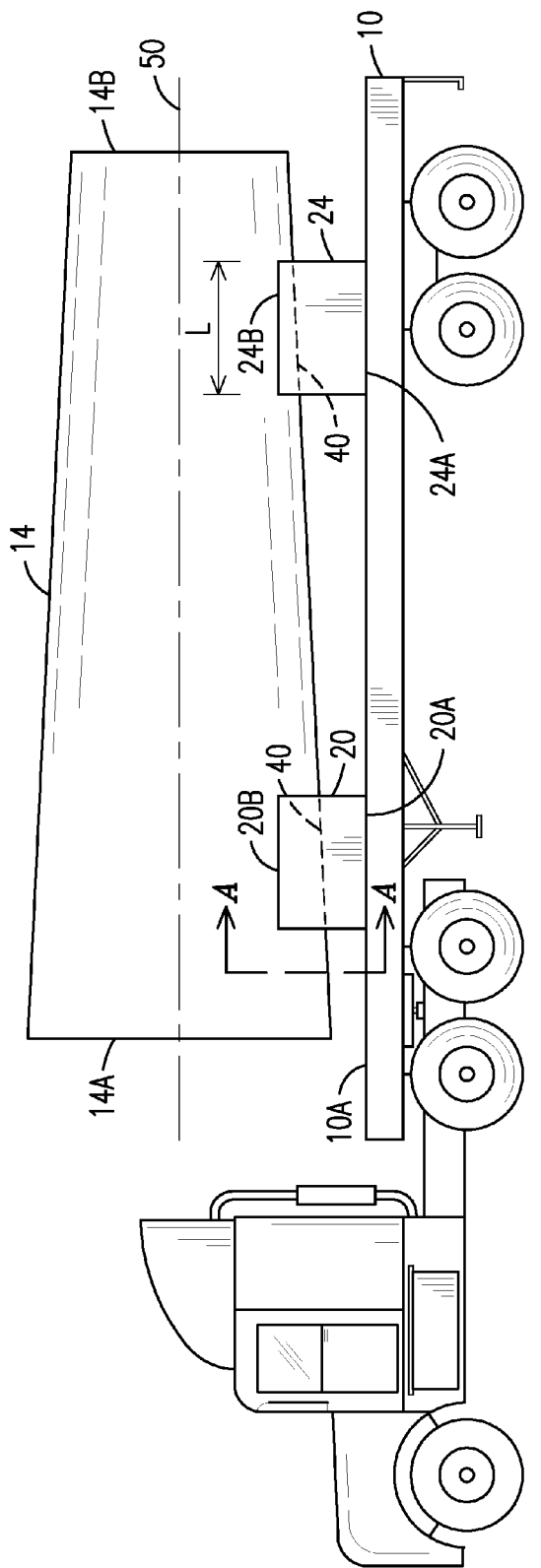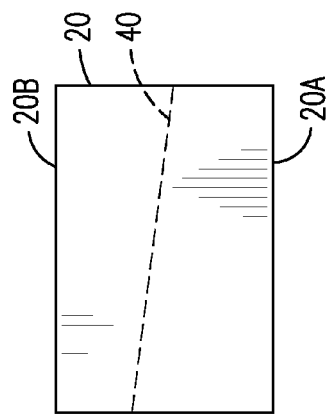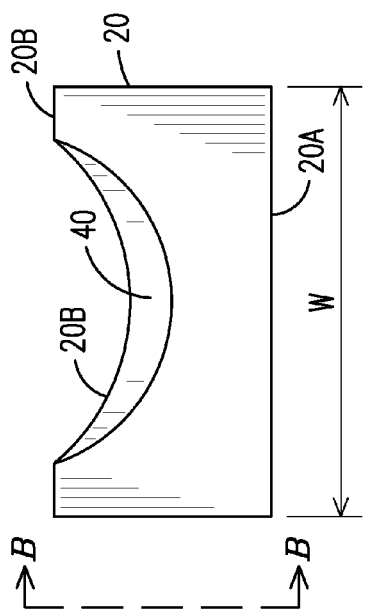
FIG. 1
FIG. 2
FIG. 3

SHIPPING SUPPORTS FOR TAPERED ELONGATED STRUCTURES

FIELD OF THE INVENTION

This invention relates in general to transportation supports for use in transporting large loads, such as wind turbine towers.

BACKGROUND OF THE INVENTION

Wind turbines exploit wind energy by converting the wind energy to electricity for distribution to users. Wind turbines are typically sited at isolated locations where the average wind speed is sufficient to generate economically-feasible electricity or where the grid may be regarded as relatively "weak" due to the few generating plants and long distances between plants. A "weak" system is characterized by a lack of robustness, a relatively low short circuit strength, e.g., less than about 10 kA and/or a variations in voltage at different points on the system.

A wind turbine comprises a nacelle enclosing a generator and other power conditioning equipment. Typically three turbine blades, extending from the nacelle, have an axis of rotation substantially parallel to the surface of the ground on which the wind turbine is mounted. The wind-driven blades drive the generator within the nacelle to generate electricity.

The nacelle is disposed at the top of a tower, which is conventionally circular in cross-section and may be as tall as about 80 meters. Current wind turbine designs include towers about 99 meters high. Since the tower height is typically measured from a horizontal centerline of the nacelle, the actual tower height is slightly less than the referenced figures.

Each tower comprises multiple sections. An 80 meter tower comprises three sections; a 99 meter tower has four or five sections. The length of each section depends on the weight of the tower, as weight is generally more restrictive for transporting the tower than tower length, since each tower is broken down into sections.

Since the speed of prevailing winds tends to increase with increasing altitude, the tower length is selected to take advantage of this condition, giving due consideration to the structural supports required with increasing tower height and additional wind loads. The nacelle is rotatable about the vertical axis of the tower to maintain proper orientation of the turbine blades relative to a wind direction.

Wind turbine locations are typically a significant distance from the manufacturing location of the wind turbine components, including in particular the supporting tower. The components and the tower must therefore be transported from the manufacturing site to the installation site where the turbine is assembled/erected and placed into operation. Various modes of transportation may be utilized during transit, including barges, railcars, vehicular trucks, etc.

Generally, wind turbine towers have a taper from a support base to a support top, as this structural feature provides sufficient strength while utilizing minimal material and limiting fabrication costs.

Transportation of the support tower is particularly problematic due to its length, weight (typically about 125,000 pounds), taper profile, and circular cross-section. Since the tower lacks a flat surface, it is difficult to stabilize the tower during transportation. Support fixtures must therefore be employed to provide the necessary stabilization and cushioning during transportation. As alluded to above, the towers are shipped in sections (and assembled at the installation site) to minimize these transportation problems.

One technique for increasing the power-generating capacity of wind turbines increases the blade length. This factor also necessitates the use of longer (i.e., taller) support towers, which further exacerbates the transportation problems.

BRIEF DESCRIPTION OF THE DRAWINGS

The invention is explained in the following description in view of the drawings that show:

FIG. 1 is a side view of support saddles constructed according to the present invention supporting a load.

FIG. 2 is a view along lines AA of FIG. 1.

FIG. 3 is a view along lines BB of FIG. 2.

DETAILED DESCRIPTION OF THE INVENTION

Figure 4:
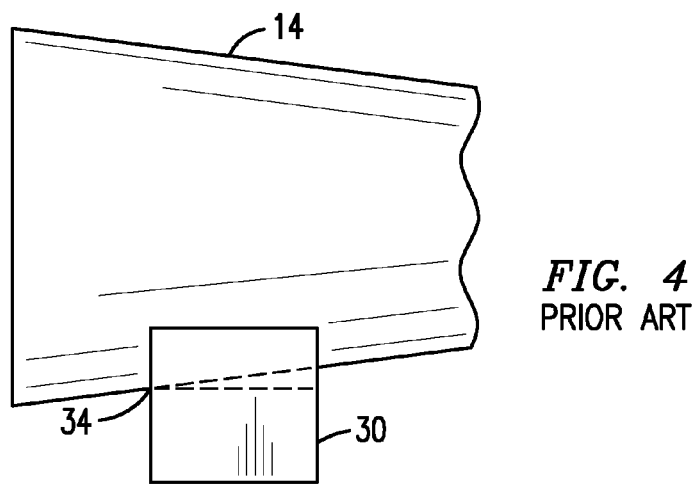
FIG. 4 is a side view of a prior art saddle without a tapered surface.

Before describing in detail the particular methods and apparatuses related to shipping tapered support towers for a wind turbine and tapered pipe sections in accordance with various aspects of the present invention, it should be observed that the present invention, in its various embodiments, resides primarily in a novel and non-obvious combination of hardware and method steps. Accordingly, the hardware and method steps have been represented by conventional elements in the drawings, showing only those specific details that are pertinent to the present invention so as not to obscure the disclosure with structural details that will be readily apparent to those skilled in the art having the benefit of the description herein.

The following embodiments are not intended to define limits of the structures or methods of the invention, but only to provide exemplary constructions. The embodiments are permissive rather than mandatory and illustrative rather than exhaustive.

FIG. 1 is an elevation view of a load bed 10 (of a rail car (i.e., a flat car) or a truck) carrying a tower section 14 (i.e., a load) for supporting a wind turbine nacelle as described above. Although reference numeral 14 refers to a tower section in FIG. 1, in another application the reference numeral 14 may refer to a length of sectionalized pipe or another elongated tapered (or non-tapered) load.

As can be seen, the tower section 14 tapers from a base 14A to a top 14B. Support saddles 20 and 24 (also referred to as support blocks) support the tower section 14 on the load bed 10. Each support saddle 20 and 24 comprises a respective lower surface 20A and 24A for resting upon a surface 10A of the load bed 10.

As can be seen more clearly in FIG. 2 (which illustrates a view along lines AA of FIG. 1) and FIG. 3, the support saddles 20 and 24 are tapered along respective upper surfaces 20B and 24B to match a taper profile in the tower section 14. The tapered surfaces 20B and 24B provide support for the tower section 14 along a substantial portion of a width W (a dimension of the saddle perpendicular to an axial centerline of the tower section 14, see FIG. 2) and length L (a dimension of the saddle parallel to the axial centerline of the tower section 14, see FIG. 1) of each support saddle 20 and 24. The taper in each saddle 20 and 24 supplies a uniform force distribution along the entire width W and along an entire length L. This uniform force distribution minimizes the risk of damaging or denting the tower section 14 during loading, unloading and transporting.

FIG. 3 illustrates a view along lines BB of FIG. 2. FIG. 3 depicts the taper in the upper surface 20B of the support saddle 20 with a dashed line 40.

Without the taper in the saddle (as in the prior art), the tower is supported only along a line where the tower section contacts the saddle. See a side view of prior art FIG. 4 illustrating a segment of the tower section 14 resting on a non-tapered surface of a prior art saddle 30. The tower section 14 is supported only along a line 34 (the line 34 extending into a plane of the display surface). Such scant support is insufficient to adequately support heavy elongated loads, such as a wind turbine tower section or a pipe, during transportation.

Figure 5:
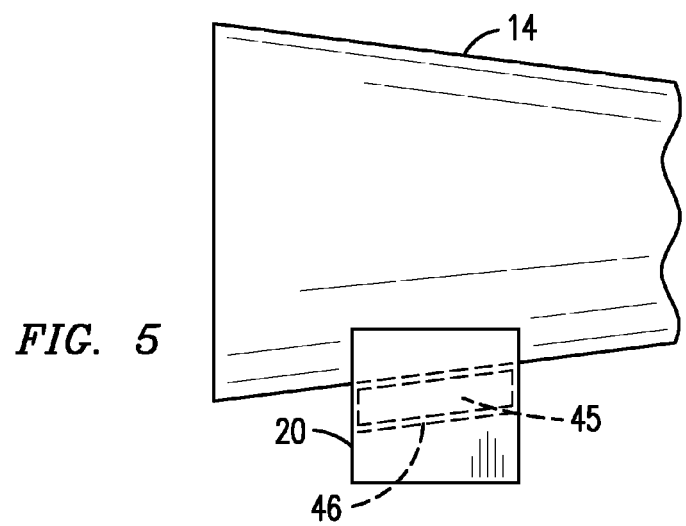
FIGS. 5 and 6 are side views of an embodiment employing a cushion for cushioning the load.

FIG. 5 illustrates another embodiment comprising a cushion 45 disposed between the tower section 14 and the tapered saddle surface. The taper in the support saddle 20 is depicted in the side view of FIG. 5 by a dashed line 46. The cushion 45 provides a cushioning or force-damping effect during transportation of the tower section 14. A similar cushion may be present above the support saddle 24, which is not illustrated in FIG. 5. Note in this embodiment an upper surface of the cushion is not tapered; the taper formed instead in the upper surface of the saddle support 20 as represented by the dashed line 46 in FIG. 5.

Figure 6:
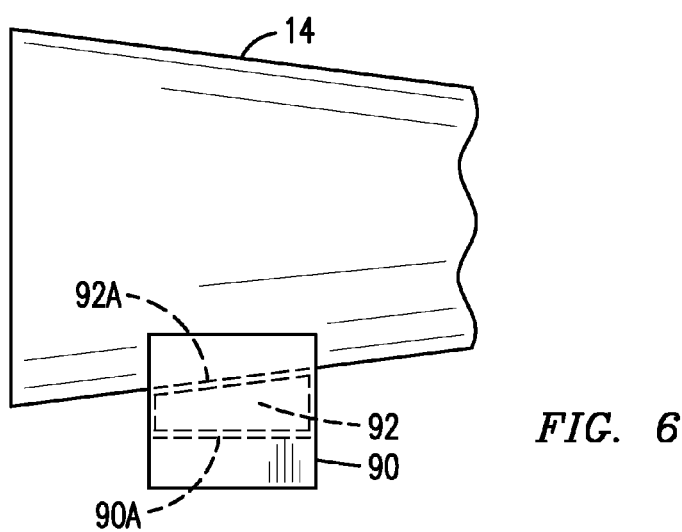

In another embodiment illustrated in FIG. 6, a taper is not present in a saddle upper surface 90A of a saddle 90. Instead, a taper appears in an upper surface 92A of a cushion 92. Thus the tapered cushion 92 overlying the non-tapered support saddle 90 provides the necessary taper to fully support the tower section 14.

Although FIG. 1 illustrates only two saddles for supporting the tower section 14, additional saddles may be employed as required by the transportation situation and the physical parameters (e.g., length, weight, diameter) of the tower section.

Returning to FIG. 1, an axial center line 50 of the tower section 14 is substantially parallel to an upper surface 10A of the load bed 10. In this application, the support saddle taper (or cushion taper) is designed to substantially match the taper profile of the tower section 14.

Figure 7:
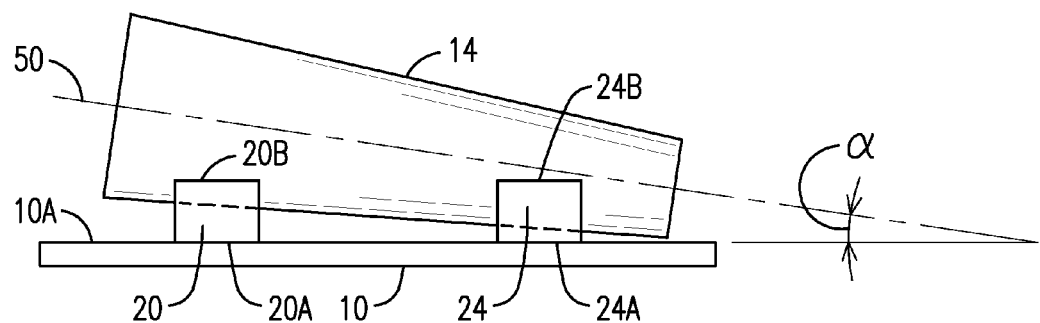
FIG. 7 is a side view of a load oriented at an angle to a load bed.

In FIG. 7 the axial center line 50 of the tower section 14 is disposed at an angle a relative to the upper surface 10A. The taper profile in the support saddles 20 and 24 accounts for this angle to ensure that the tower section 14 contacts the saddles 20 and 24 along substantially the entire width and length of each support saddle 20 and 24. Failing to account for this angle a does not provide support for the tower section 14 along the entire contact area between the support surfaces 20B and 24B and the tower section 14.

In another embodiment, the support saddles supporting the tower section 14 are not tapered to match a taper profile of the tower section 14. Instead, inserts 64 and 65 (see FIG. 8) are disposed within a well defined in an upper surface 68A of a saddle support 68. A taper in upper surfaces 64A and 65A of the respective inserts 64 and 65 matches a taper profile of the tower section 14. A gap 69 is defined between the inserts 64 and 65. Because in one embodiment the inserts 64 and 65, when placed in proximate relationship, are about three to six feet long and about ten feet wide, partitioning the inserts into sections 64 and 65 reduces the risk of damage during placement of the inserts into well of the saddle support 68.

Figure 8:
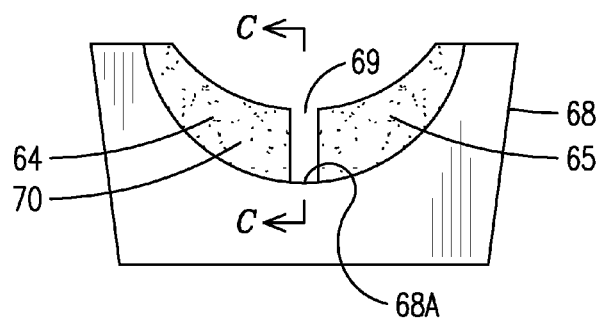
FIG. 8 is a front view of a support saddle with inserts according to an embodiment of the invention.

The inserts 64 and 65 may be held within the saddle support 68 by gravity and/or by a positive capture system, comprising, for example, one or more pins or bars not illustrated in FIG. 8. The inserts 64 and 65 are restrained against lateral and longitudinal movement by pins and/or angles not shown in FIG. 8. The inserts 64 and 65 may also be vertically positioned and/or captured by these same pins and/or angles.

In one embodiment (not illustrated) a tarp overlies the inserts 64 and 65. Commonly, the tarp comprises a water resistant material having a surface texture that will not mark or damage the tower section 14.

The inserts 64 and 65 are removable after use. Typically, the inserts 64 and 65 are removed from the saddle support 68 only if a tower section with a different taper is to be transported. In this situation, inserts with a different taper are inserted into the saddle 68.

Figure 9:
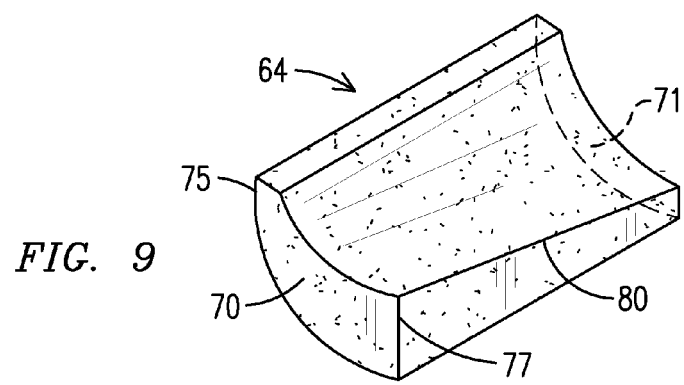
FIG. 9 illustrates an insert for use with support saddles of the present invention.

FIG. 9 is a perspective view of the insert 64, illustrating a taper from a front face 70 to a rear face 71. The taper extending from an edge 75 to the rear face 71 is likely not identical to a taper extending from and edge 77 to the rear face 71. Thus the inserts 64 and 65 may not be interchangeable and instead are mirror images.

Figure 10:
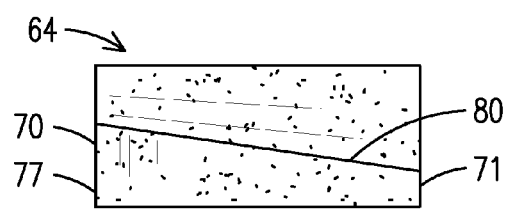
FIG. 10 is a view along lines CC of FIG. 8.

FIG. 10 is a view along lines CC of FIG. 8, depicting a tapered surface 80 in the insert sections 64 and 65. Since the inserts 64 and 65 are in contact with the tower, a taper in the tapered surface 80 matches a taper profile of the tower section 14, taking into account an angle between a centerline of the tower section and the load bed.

Figure 11:
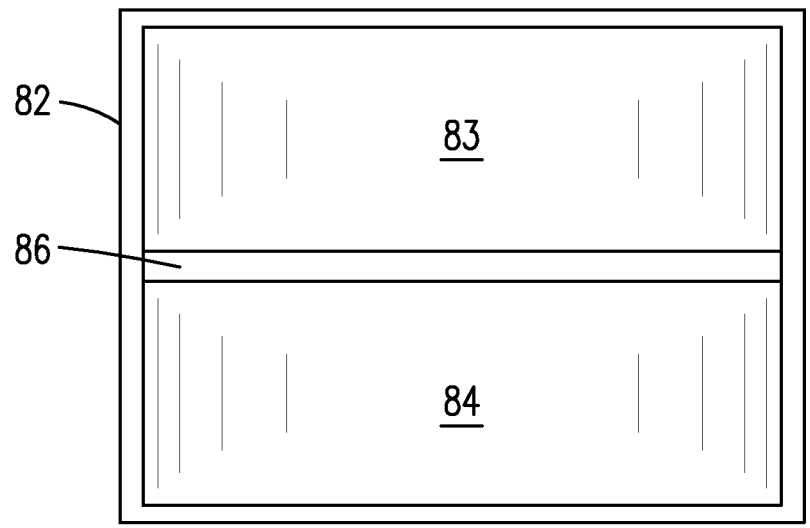
FIGS. 11 and 12 are top views of embodiments employing additional insert arrangements.

In FIG. 8 the gap 69 is disposed parallel to an axial centerline of the load. FIG. 11 illustrates a support saddle 82 and inserts 83 and 84 disposed to form a gap 86 therebetween. The gap 86 is disposed perpendicular to an axial centerline of the load.

Figure 12:
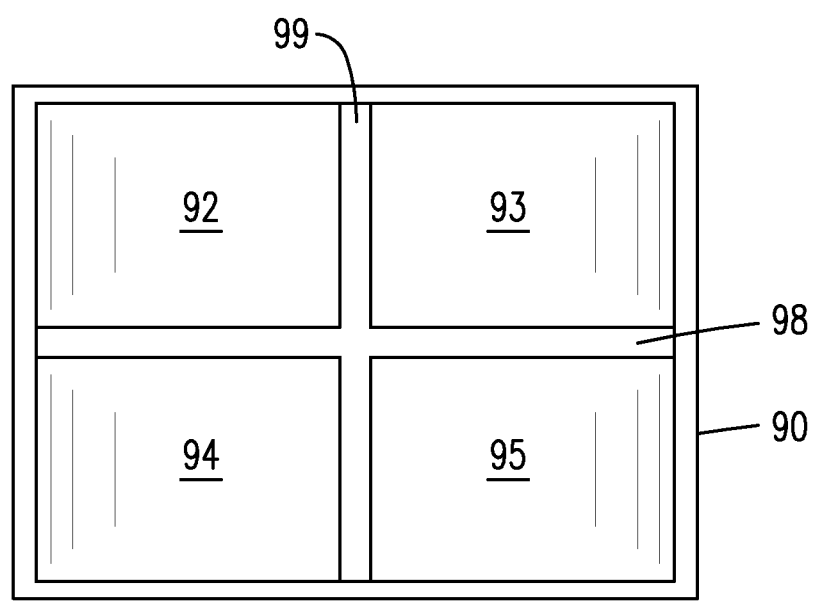

In certain applications it may be preferable to employ four inserts instead of the two inserts illustrated in FIGS. 8 and 11. FIG. 12 is a top view of a saddle support 90 having four inserts 92, 93, 94 and 95 disposed within a well formed in an upper surface of the saddle support 90. A gap 98 extends between inserts 92 and 94 and between inserts 93 and 95. A gap 99 extends between inserts 92 and 93 and between inserts 94 and 95.

Cushions as discussed with reference to FIGS. 5 and 6 can also be used with inserts, such as the insert embodiments of FIGS. 8, 11 and 12.

A material of the saddles and the inserts typically comprises a low to medium grade steel, such as grades A36 or A572.

In certain embodiments, the cushions referred to herein are made from a closed cell foam material about two inches thick. The foam is semi-rigid such that under a tower load the foam does not substantially bulge or distort. But the foam material is sufficiently soft to conform to any irregularities in the tower, saddle or saddle insert.

During transportation of the tower section 14 at least two support saddles are usually employed to support the tower section 14, as illustrated in FIG. 1 for example. However, it is recognized that the tapers in each support saddle may be different to match the taper profile of the region of the tower section 14 in contact with the saddle. The embodiment employing support saddle inserts avoids the additional material and fabrication costs associated with manufacturing support saddles to accommodate various tower sizes and taper profiles. Instead, only differently-shaped saddle inserts are required.

Although the embodiments of the present invention have been described for use with a circular cross-section shaped tower, the embodiments can also be used with other tower cross-sectional shapes.

Those familiar with wind turbine towers are aware that for certain three—piece towers only the base section and the top section exhibit a taper profile. The taper on the base section may be less than the taper on the top section, with no taper on the middle section. However, other three-piece towers may exhibit a taper in each of the three sections.

Also, in a four or five piece tower more than one section may not be tapered.

Notwithstanding these different taper profiles in different tower sections, with some sections having no taper, the support saddles and/or cushions and/or inserts of the present embodiments can be used to support the tower sections during transportation.

In particular, for maximum tower support during transportation, the taper profile in the surface in contact with the tower (i.e., an upper surface of the saddle, an upper surface of the insert or an upper surface of the cushion) should substantially match the taper profile in the tower. However, such a substantial match in the taper profiles is necessarily required. Depending on parameters of the tower (e.g., length and weight), parameters of the transportation vehicle and the degree of stability required during transportation) minimally tapered towers or towers without a taper may be received within and carried by a tapered contact surface (i.e., the upper surface of the saddle, the upper surface of the insert or the upper surface of the cushion) where the taper in the contacting surface is not substantially matched in the region where the load contacts the tapered contact surface. Thus use of the tapered saddles, tapered inserts and tapered cushions of the present invention is not limited to use with towers having tapers that substantially match the taper in the contact surface. Permitting use in situations with non-matching tapers provides some degree of flexibility in the use of the tapered contact surface and avoids construction of a tapered contact surface to substantially match every tower taper profile, but provides sufficient support during transportation.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A support saddle for supporting a load having a taper profile along an axial length of the load, the support saddle comprising:
   a lower surface for resting on a surface of a transportation vehicle; and
   an upper surface defining a taper to substantially match the taper profile of the load in a region of the load contacting the upper surface, the upper surface for receiving the load, wherein an axial centerline of the load is at an angle alpha to the surface of the transportation vehicle, and wherein the upper surface defines a taper to match the combined effect of the taper profile of the load and the angle alpha, and wherein the angle alpha has a positive value greater than zero degrees.

2. The support saddle of claim 1 wherein the surface of the transportation vehicle comprises one of a bed of a rail car and a bed of a vehicular truck.

3. The support saddle of claim 1 wherein the load comprises one of a wind turbine tower section and a pipe.

4. The support saddle of claim 1 further comprising a cushion disposed between the upper surface of the support saddle and the load.

5. An apparatus for supporting a load having a taper profile along an axial length of the load, the apparatus comprising:
   a base member for resting upon a surface of a transportation vehicle;
   the base member having a base upper surface; and
   an insert assembly disposed above the base upper surface, the insert assembly having an insert upper surface defining a taper to substantially match the taper profile of the load in a region of the load contacting the insert upper surface, the insert upper surface for receiving the load.

6. The apparatus of claim 5 wherein the surface of the transportation vehicle comprises one of a bed of a rail car and a bed of a vehicular truck.

7. The apparatus of claim 5 wherein the load comprises one of a wind turbine tower section and a pipe.

8. The apparatus of claim 5 wherein an axial centerline of the load is substantially parallel to the surface of the transportation vehicle.

9. The apparatus of claim 5 wherein an axial centerline of the load is at an angle alpha to the surface of the transportation vehicle, and wherein the insert upper surface defines a taper to match the taper profile of the load and the effect of the angle alpha.

10. The apparatus of claim 5 wherein the insert assembly comprises a single insert piece or comprises a first insert piece spaced apart from a second insert piece and defining a gap therebetween, the gap parallel to an axial centerline of the load or the gap perpendicular to the axial centerline of the load.

11. The apparatus of claim 5 wherein the insert assembly comprises a first insert piece overlying a second insert piece, the first insert piece in contact with the base upper surface, the second insert piece having the taper formed in an upper surface of the second insert piece.

12. The apparatus of claim 5 wherein the insert assembly comprises first and second inserts spaced apart to form a first gap therebetween, the first gap parallel to an axial centerline of the load, further comprising third and fourth inserts spaced apart to form a second gap therebetween, the second gap parallel to the axial centerline of the load.

13. An apparatus for supporting a load having a taper profile along an axial length of the load, the apparatus comprising:
   a base member for resting upon a surface of a transportation vehicle;
   the base member having a base upper surface; and
   a cushion disposed above the base upper surface, the cushion having a cushion upper surface defining a taper to substantially match the taper profile of the load in a region of the load contacting the cushion upper surface, the cushion upper surface for receiving the load.

14. The apparatus of claim 13 wherein the surface of the transportation vehicle comprises one of a bed of a rail car and a bed of a vehicular truck.

15. The apparatus of claim 13 wherein the load comprises one of a wind turbine tower section and a pipe.

16. The apparatus of claim 13 wherein an axial centerline of the load is substantially parallel to the surface of the transportation vehicle.

17. The apparatus of claim 13 wherein an axial centerline of the load is at an angle alpha to the surface of the transportation vehicle, and wherein the base upper surface defines a taper to match the taper profile of the load and the effect of the angle alpha.

18. The apparatus of claim 13 further comprising an insert disposed between the base upper surface and the cushion.

19. A system for transporting a load having a taper profile along an axial length, the system comprising:
- a first base member spaced apart from a second base member, the first and second base members for resting upon a surface of a transportation vehicle;
- the first and second base members each having a respective first and second base upper surface; and
- a first and second cushion disposed above the respective first and second base upper surfaces, the first and second cushions each having a cushion upper surface defining a taper to substantially match the taper profile of the load in a region of the load contacting the cushion upper surface, the cushion upper surface for receiving the load.

* * * * *